United States Patent
Canale et al.

(10) Patent No.: US 9,738,281 B2
(45) Date of Patent: *Aug. 22, 2017

(54) AUTOMATED SETTING OF CRUISING SPEEDS

(71) Applicant: International Business Machines Corporation, Armonk, NY (US)

(72) Inventors: John F. Canale, Hopewell Junction, NY (US); Raul A. Pelaez, New Windsor, NY (US); Mark A. Shatraw, Poughkeepsie, NY (US); Charles J. Stocker, IV, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,386

(22) Filed: Oct. 20, 2016

(65) Prior Publication Data

US 2017/0080935 A1    Mar. 23, 2017

Related U.S. Application Data

(63) Continuation of application No. 14/979,708, filed on Dec. 28, 2015, now Pat. No. 9,545,931, which is a
(Continued)

(51) Int. Cl.
*B60W 40/08* (2012.01)
*B60W 30/14* (2006.01)
(Continued)

(52) U.S. Cl.
CPC .......... *B60W 30/143* (2013.01); *B60W 40/08* (2013.01); *B60W 50/0098* (2013.01);
(Continued)

(58) Field of Classification Search
CPC ................. B60W 40/08; B60W 40/09; B60W 2040/0809; B60W 2040/0872;
(Continued)

(56) References Cited

U.S. PATENT DOCUMENTS 7,757,803 B2    7/2010   Fiske et al.
8,527,146 B1 *  9/2013   Jackson ............ B60W 50/0098
                                                  180/273
(Continued)

FOREIGN PATENT DOCUMENTS

DE     10310719 A1    10/2003
WO   2010071498 A1     6/2010

OTHER PUBLICATIONS

Rosenfeld et al., "Learning Driver's Behavior to Improve the Acceptance of Adaptive Cruise Control", Proceedings of the Twenty-Fourth Innovative Appications of Artificial Intelligence Conference, Copyright © 2012, Association for the Advancement of Artificial Intelligence, pp. 2317-2322.
(Continued)

*Primary Examiner* — Thomas G Black
*Assistant Examiner* — Sara Lewandroski
(74) *Attorney, Agent, or Firm* — Gilbert Harmon, Jr.

(57) ABSTRACT

An approach to setting a cruise control speed based on identifying a vehicle operator and analyzing metadata associated with the vehicle operator. The identity of the vehicle operator and any passengers is determined based on identity sensors in the vehicle or by manual identity entry. Metadata, associated with the vehicle operator, is retrieved from the metadata database, located either locally or remotely. The metadata is analyzed based on factors such as the current route and the identity of any passengers. The cruise control speed is set based on the results of the analysis. Any changes to the setting are updated in the metadata database.

1 Claim, 3 Drawing Sheets

Related U.S. Application Data continuation of application No. 14/862,471, filed on Sep. 23, 2015.

(51) Int. Cl.

| | | |
|---|---|---|
| *G06K 9/00* | (2006.01) | |
| *G06F 17/30* | (2006.01) | |
| *B60W 50/00* | (2006.01) | |
| *B60N 2/00* | (2006.01) | |
| *B60R 21/015* | (2006.01) | |
| *G01S 13/93* | (2006.01) | |

(52) U.S. Cl.
CPC .. *G06F 17/30345* (2013.01); *G06F 17/30386* (2013.01); *G06K 9/00255* (2013.01); *G06K 9/00832* (2013.01); B60G 2400/62 (2013.01); B60G 2800/982 (2013.01); B60K 2310/24 (2013.01); B60K 2310/30 (2013.01); B60N 2/002 (2013.01); B60R 21/01512 (2014.10); B60W 2040/0809 (2013.01); B60W 2040/0881 (2013.01); B60W 2050/0063 (2013.01); B60W 2050/0075 (2013.01); B60W 2050/0077 (2013.01); B60W 2420/403 (2013.01); B60W 2420/42 (2013.01); B60W 2540/28 (2013.01); B60W 2720/10 (2013.01); B60W 2720/103 (2013.01); B60W 2750/40 (2013.01); B60Y 2300/143 (2013.01); G01S 2013/9321 (2013.01)

(58) Field of Classification Search
CPC ... B60W 2040/0881; B60W 2040/089; B60W 30/14; B60W 30/143; B60W 30/146; B60W 30/162; B60G 2400/62; B60G 2800/982; B60N 2/002; B60R 21/01512; B60K 2310/00; B60K 2310/24; B60K 2310/242; B60K 2310/244; B60K 2310/30; B60Y 2300/14; B60Y 2300/143; B60Y 2300/146; B60Y 2300/162; G01S 2013/9321
USPC .......................................................... 701/93
See application file for complete search history.

(56) References Cited

U.S. PATENT DOCUMENTS

| | | | | |
|---|---|---|---|---|
| 9,171,268 B1* | 10/2015 | Penilla | .................. | G06Q 10/02 |
| 2008/0245598 A1* | 10/2008 | Gratz | .................. | B60R 25/1004 180/287 |
| 2009/0276135 A1 | 11/2009 | Hagemann et al. | | |
| 2011/0137520 A1* | 6/2011 | Rector | .............. | H04M 1/72577 701/36 |
| 2011/0313821 A1* | 12/2011 | Hilton | .................... | G07C 11/00 705/13 |
| 2012/0065863 A1* | 3/2012 | Takagi | ................. | B60K 31/047 701/96 |
| 2012/0215416 A1* | 8/2012 | Poulin | ................. | B60W 30/146 701/93 |
| 2013/0253797 A1* | 9/2013 | McNew | ............... | G06N 99/005 701/98 |
| 2014/0012479 A1 | 1/2014 | Zhao | | |
| 2014/0043152 A1 | 2/2014 | Lippman et al. | | |
| 2014/0200788 A1 | 7/2014 | Eriksson et al. | | |
| 2014/0200789 A1 | 7/2014 | Pietron et al. | | |
| 2014/0229035 A1 | 8/2014 | Rector et al. | | |
| 2014/0282931 A1* | 9/2014 | Protopapas | ............. | G06F 21/31 726/5 |
| 2015/0217771 A1* | 8/2015 | Kelly | ..................... | B60K 28/16 701/93 |
| 2015/0224990 A1* | 8/2015 | Kim | ................. | B60W 50/0097 701/98 |
| 2015/0246676 A1* | 9/2015 | Keren | ................. | B60W 30/146 701/93 |
| 2016/0001781 A1* | 1/2016 | Fung | ..................... | G06F 19/345 701/36 |
| 2016/0176409 A1* | 6/2016 | Kirsch | .................. | B60W 40/08 701/37 |
| 2016/0221585 A1* | 8/2016 | Ichioka | ................. | B60W 50/14 |
| 2016/0236678 A1* | 8/2016 | Upadhyay | ................ | B60N 2/26 |

OTHER PUBLICATIONS

Canale et al., "Automated Setting of Cruising Speeds", U.S. Appl. No. 14/979,708, filed Dec. 28, 2015, 21 pages.
Canale et al., "Automated Setting of Cruising Speeds", U.S. Appl. No. 14/862,471, filed on Sep. 23, 2015, 24 pages.
Canale et al., "Automated Setting of Cruising Speeds", U.S. Appl. No. 15/298,386, filed Nov. 29, 2016, 22 pages.
Canale et al., "Automated Setting of Cruising Speeds", U.S. Appl. No. 15/363,584, filed Nov. 29, 2016, 22 pages.
IBM Appendix P, list of patents or patent applications treated as related, Nov. 30, 2016, 2 pages.

\* cited by examiner

AUTOMATED SETTING OF CRUISING SPEEDS

BACKGROUND OF THE INVENTION

The present invention relates generally to configuring cruise control parameters on a vehicle and more specifically, to setting a cruising speed based on vehicle occupants.

Cruise control on a vehicle provides the capability to maintain a configurable vehicle speed without assistance from the vehicle operator after initial setting. The use of the vehicle's cruise control by the operator leads to less fatigue and safer operation because the operator is not required to continuously look away from the road to determine the speed of the vehicle and adjust the speed with the accelerator and/or brakes. Cruise control is not without shortcomings however, cruise control does not remember desired vehicle speeds of specific operators or circumstances impacting desired speeds. Accordingly, an operator enters vehicle speed settings for each use of cruise control.

SUMMARY

According to an embodiment of the present invention, a computer program product for setting a cruise control speed, the computer program product comprising: one or more computer readable storage media and program instructions stored on the one or more computer readable storage media, the program instructions comprising: program instructions to determine an identity of an operator of a vehicle and one or more passengers of the vehicle based on at least one of a manually entered identity and one or more identity sensors associated with the vehicle wherein the one or more identity sensors comprise biometric sensors and cameras for facial recognition and the identity sensors are installed in at least one of a passenger compartment associated with the vehicle or a remote device disposed within the vehicle; program instructions to retrieve metadata associated with the identity wherein the metadata comprises one or more speed settings based on a travel route, the identity of the operator and the identity of the one or more passengers; program instructions to set a cruise control speed based on an analysis of the metadata wherein the analysis comprises selecting the cruise control speed based on the identity of the operator and the identity of the one or more passengers of the vehicle; and program instructions to update the metadata, associated with the operator, with speed setting changes made by the operator wherein the metadata is stored on at least one of a metadata database associated with the vehicle and a metadata database associated with a server communicatively connected to the vehicle.

DETAILED DESCRIPTION

The embodiments depicted and described herein recognize the challenges of maintaining speed settings for specific operators of a vehicle. For example, when multiple operators share a vehicle, the specific operator of the vehicle should be determined before assigning preferences on an individual basis. Further, if a specific operator has preferences based on characteristics such as, but not limited to, the presence or absence of passengers and their identities, then the identities of passengers should be determined before retrieving or storing data associated with cruise control speed settings. In another example, specific route segments traveled by specific vehicle operators can have different speed settings based on the particular route segment, wherein the speed settings can be stored for later retrieval and use, on a per operator basis, as the vehicle traverses the route segment under the control of a specific operator.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
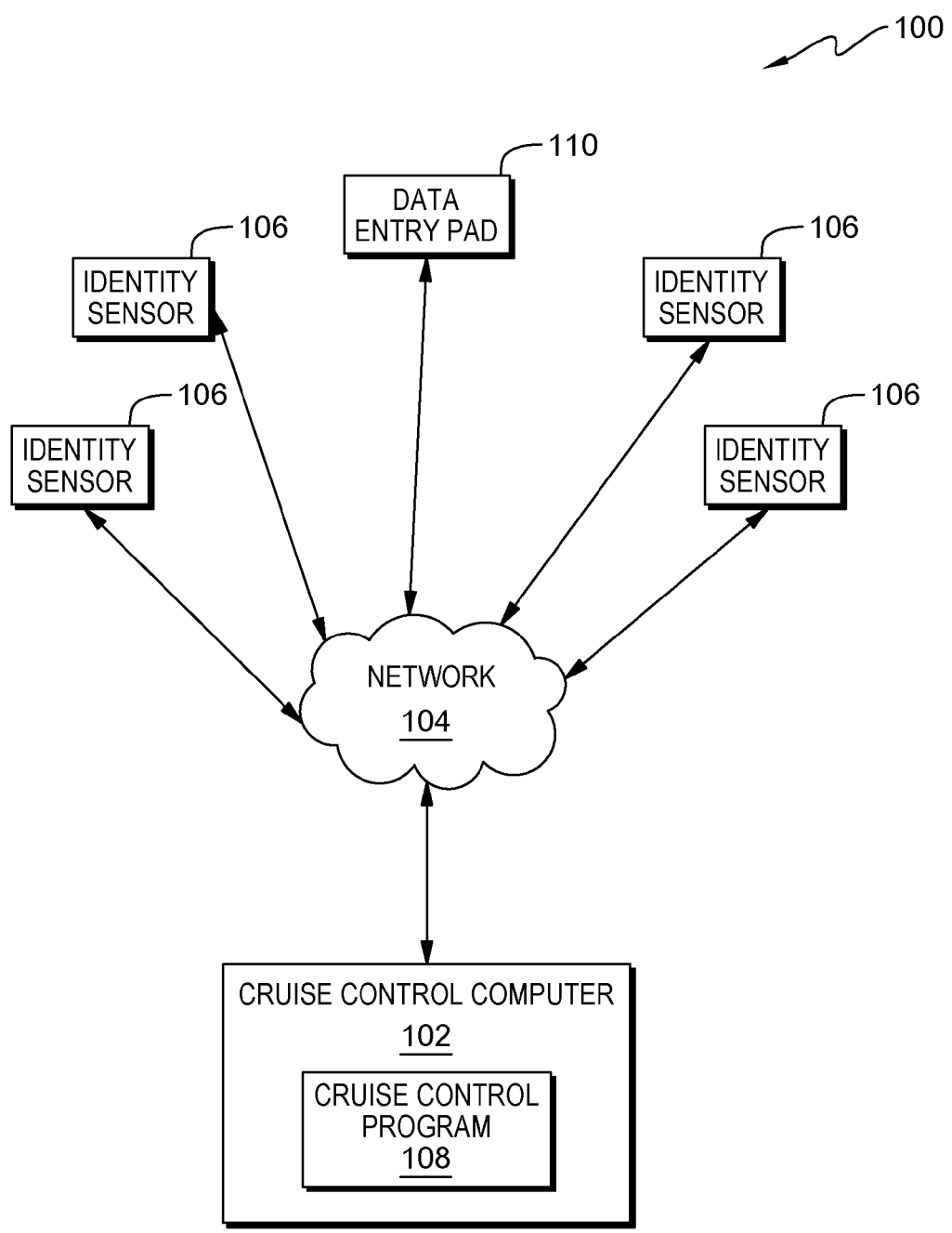
FIG. 1 is a functional block diagram depicting a metadata cruise control computing environment, in accordance with an embodiment of the present invention.

FIG. 1 is a functional block diagram illustrating, generally, an embodiment of a cruise control environment 100. The cruise control environment 100 comprises a cruise control program 108 operating on a cruise control computer 102, a plurality of identity sensors 106, a data entry pad 110 and a network 104 supporting communications between the cruise control program 108, operational on the cruise control computer 102, the plurality of identity sensors 106 and the data entry pad 110. Although represented as a plurality of identity sensors, some embodiments can operate with a single identity sensor 106 or without identity sensors 106 if an occupant of the vehicle manually inputs the identity of the occupants of the vehicle to the cruise control computer 102 via the identity pad 110. Similarly, some embodiments can operate without the identity pad 110 if the identity of the occupants can be determined without manual data entry.

Cruise control computer 102 can be any type of embedded computer suitable for installation in a vehicle and capable of communicating with the plurality of identity sensors 106 and data entry pads 110 via network 104. Cruise control computer 102 includes cruise control program 108 for determining vehicle occupants, managing metadata associated with the vehicle occupants and setting cruise control speeds. Cruise control computer 102 can include internal and external hardware components, as depicted and described in further detail with respect to FIG. 4.

Network 104 can be, for example, a local area network (LAN), a wide area network (WAN) such as the Internet, or a combination of the two, and can include wired, wireless, or fiber optic connections. In general, network 106 can be any combination of connections and protocols that will support communications between cruise control computer 102 and the plurality of identity sensors 106.

Identity sensors 106 can be, but are not limited to, biometric sensors and facial recognition cameras. For example, vehicle manufacturers or owners could install biometric sensors in seats or armrests and cameras in dashboards, seatbacks or ceiling compartments such that the camera installation provides a line-of-sight to the seating locations of vehicle occupants. In another aspect, the occupants of a vehicle could share a remote device (not shown) with biometric sensors and/or facial recognition cameras to identify themselves.

Data entry pad 110 provides the capability to manually enter occupant identities. For example, an occupant identity can be the identity an operator of the vehicle or the identity of a passenger of the vehicle. The occupant can enter a code assigned to an individual or to a group such as one or more children associated with the occupant operating the vehicle.

Figure 2:
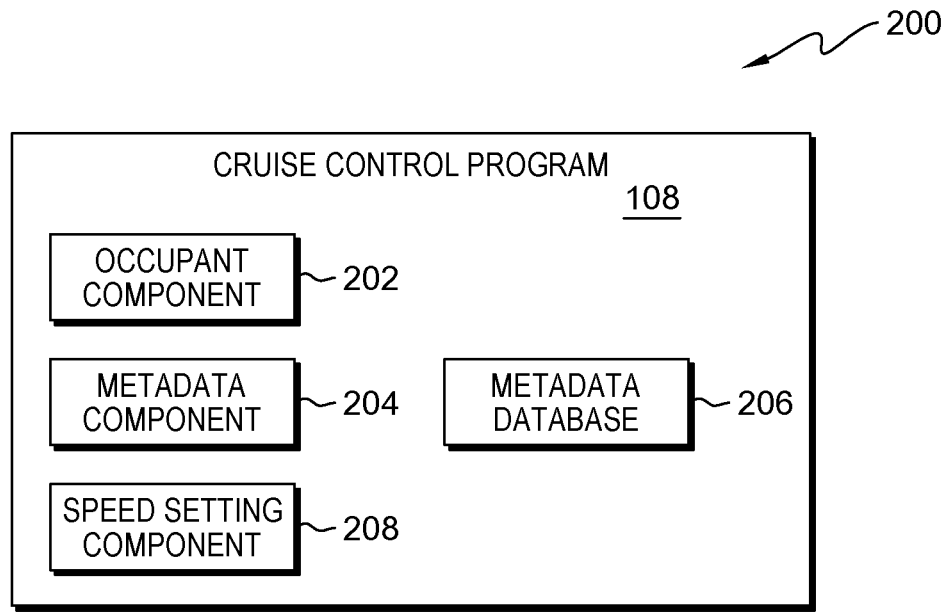
FIG. 2 is a functional block diagram depicting a metadata based cruise control, in accordance with an embodiment of the present invention.

FIG. 2 is a functional block diagram 200 illustrating cruise control program 108 comprising an occupant component 202, a metadata component 204, a metadata database 206 and a speed setting component 208.

Occupant component 202 of an embodiment of the present invention provides the capability to determine the identity of the occupants in the vehicle. Occupant component 202 can determine the identity of the occupants either automatically or manually. Occupant component 202 further classifies occupants of the vehicle as an operator of the vehicle and passengers of the vehicle.

Occupant component 202 can automatically determine the operator of the vehicle based on inputs such as, but not limited to, an identity encoded on the key/fob used to start the vehicle and one or more of the identity sensors 106 installed in the vehicle. The identity sensors employed for determining the operator of the vehicle determine an identity of the person sitting in the driver's seat. Occupant component 202 can automatically determine the passengers of the vehicle based on identity sensors 106 positioned in the passenger cabin. The identity sensors 106 employed for determining the passengers of the vehicle are associated with the one or more passenger seats of the vehicle.

In another aspect, occupant component 202 can accept manual input at a data entry pad 110 to identify the operator and passengers onboard the vehicle. Further, the remote device (not shown) previously described can include a data entry pad for entering the identity of a passenger.

Metadata component 204 of an embodiment of the present invention provides the capability analyze the metadata to associate the identity of the vehicle operator, determined by occupant component 202, with metadata archived in the metadata database 206. Metadata component 204 can interact with a global positioning system (GPS) device (not shown) to collect preferred routes of the vehicle and store the preferred routes in metadata database 206 based on the vehicle operator identity. Further, the preferred speeds of each vehicle operator can be stored with the preferred routes.

For example, metadata component 204 can determine that a first operator of the vehicle, a mother, prefers to travel at the posted speed limit for the traversed routes while a second operator of the vehicle, a father, prefers to travel at 5 miles per hour over the posted speed limit on primary and secondary routes while traveling 9 miles per hour over the posted speed limit on interstate highways. Metadata component 204 can determine these vehicle operation characteristics associated with each identified vehicle operator and store this information in the metadata database 206. The preferred speeds of the vehicle can vary as the vehicle traverses the preferred route with the metadata component storing a preferred speed based on changes in vehicle operation detected by metadata component 204.

In another aspect of the embodiment, metadata component 204 can associate the presence of vehicle passengers and changes in vehicle operation characteristics, if any, with vehicle operators. For example, metadata component 204 can determined that a vehicle operator, a mother, drives 5 miles per hour less than the posted speed limit when identified passengers, her children, are riding in the vehicle and store this information in metadata database 206. Further, metadata component 204 saves any manual changes to previously saved operating parameters as the new operating parameters for the associated operating characteristics.

Metadata database 206 of an embodiment of the subject invention provides the capability to store information associated with the operator of the vehicle. The information comprises the identity of the vehicle operator, the identity of any passengers, if any, riding in the vehicle with the vehicle operator, data retrieved from a GPS device, if any, depicting routes traveled by the vehicle operator, cruise control speeds set by the vehicle operator based on the route traveled and vehicle passengers and the like. The metadata database 206 can reside locally in the cruise control computer 102 or it can reside remotely from the cruise control computer. Remotely from the cruise control computer 102 can be, but not limited to, on another computer in the vehicle, on a memory device such as, but not limited to a flash drive communicatively connected to the cruise control computer 102 or on a server computer (not shown) communicatively wirelessly connected to the cruise control computer 102.

Speed setting component 208 of an embodiment of the subject invention provides the capability to interact with the metadata component 204 and receive a current speed setting for use when the vehicle operator activates the cruise control. The speed setting component 208 can provide different speed settings based on the vehicle location and the metadata associated with the vehicle operator.

Figure 3:
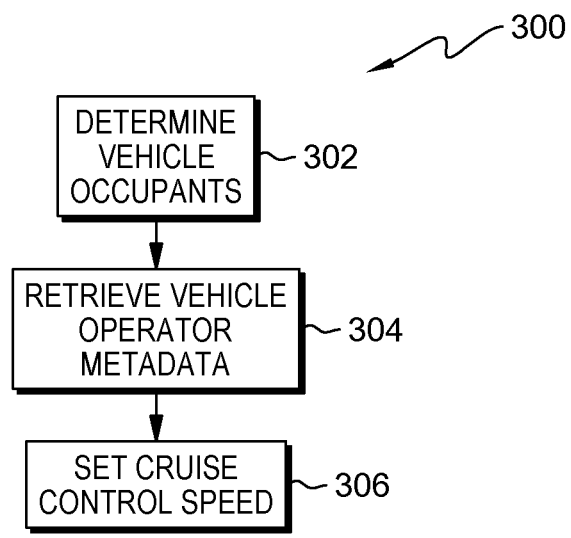
FIG. 3 is a flowchart depicting operational steps of an automated cruise control speed setting program, within a metadata cruise control computing environment, in accordance with an embodiment of the present invention.

FIG. 3 is a flowchart 300 depicting operational steps of a cruise control program 108 setting a cruise control speed based on the occupants of a vehicle and metadata associated with the operator of the vehicle, in accordance with an embodiment of the present invention. The flowchart 300 comprises the steps of determine vehicle occupants 302, retrieve vehicle operator metadata 304 and set cruise control speed 306.

The determine vehicle occupants 302 step of embodiments depicted herein determines, through occupant component 202, the identity of the occupants of a vehicle. The occupants of the vehicle comprise the operator of the vehicle and the passengers, if any, of the vehicle. The occupant component 202 then provides the results of the determination to the metadata component 204 for further processing.

Next, the retrieve vehicle operator metadata 304 step retrieves metadata, through the metadata component 204, from the metadata database 206 based on the identity of the vehicle operator. The metadata further comprises characteristics of the operator related to vehicle operation based on the presence and identity of passengers in the vehicle and the destination and/or route travelled. The characteristics of the operator related to vehicle operation can be, but are not limited to, the cruise control speed setting and the path traveled to the desired destination.

Continuing, the set cruise control speed 306 step processes the retrieved metadata via the speed setting component 208 and determines the appropriate cruise control speed setting. The speed setting component 208 basis the appropriate speed setting on factors such as, but not limited to, the identity of passengers traveling in the vehicle and the route traveled to the destination. For example, an analysis of the metadata shows that the vehicle operator, a mother, and passengers, her children, are traveling in the vehicle. The mother activates the cruise control and metadata stored in the metadata database 206 provides a speed setting indicating that the mother drives 10 miles per hour slower when her children are present in the vehicle. Accordingly, the cruise control speed is set to a value 10 miles per hour slower than the mother drives for the current route location when her children are not present in the vehicle.

Figure 4:
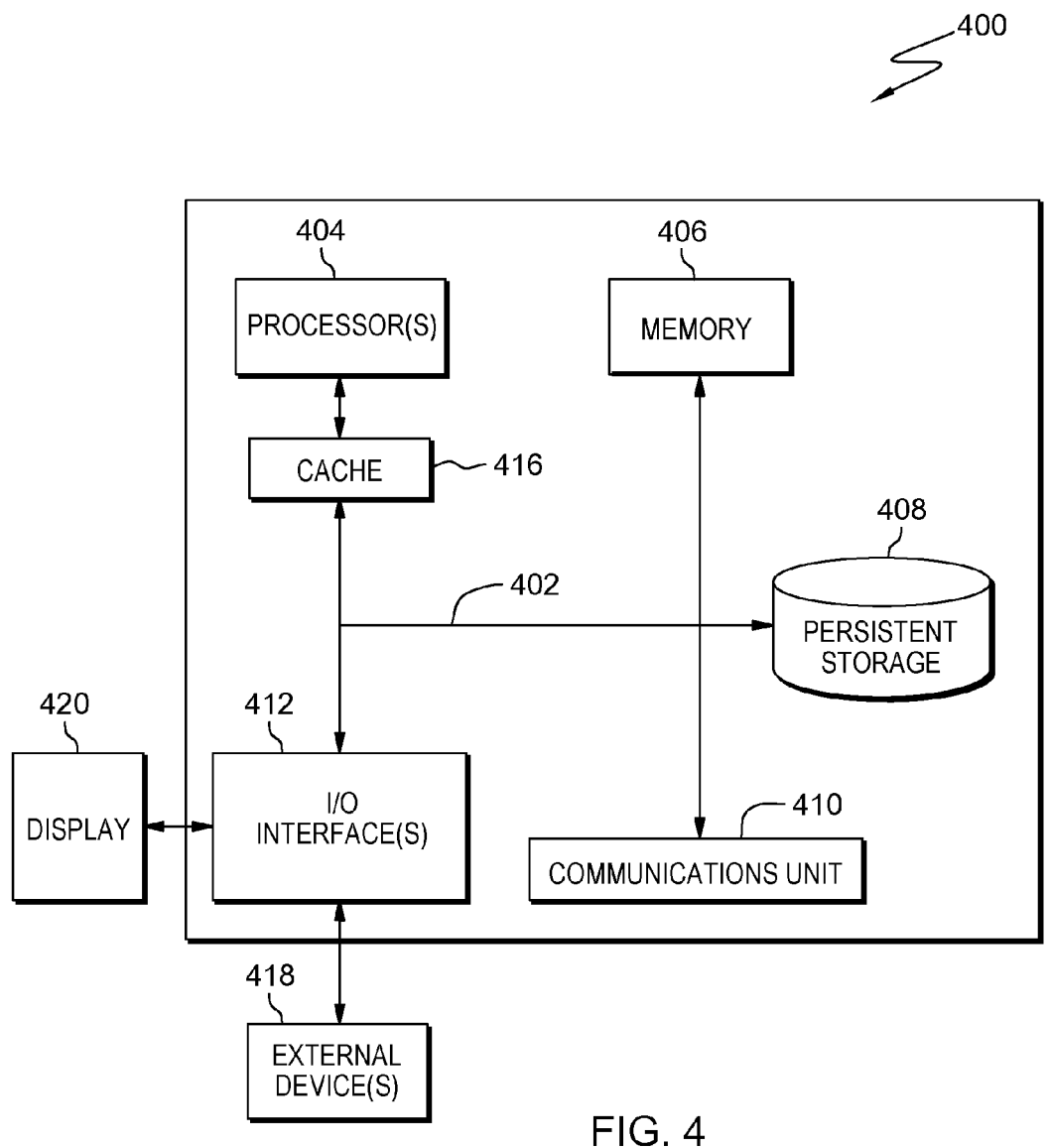
FIG. 4 is a block diagram of components of the metadata cruise control computing environment, in accordance with an embodiment of the present invention.

FIG. 4 depicts computer system 400, an example computer system representative of cruise control computer 102. Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for setting a cruise control speed, the computer program product comprising:
    one or more non-transitory computer readable storage media and program instructions stored on the one or more non-transitory computer readable storage media, the program instructions comprising:
        program instructions to determine an identity of an operator of a vehicle and one or more passengers of the vehicle based on at least one of a manually entered identity and one or more identity sensors associated with the vehicle wherein the one or more identity sensors comprise biometric sensors and cameras for facial recognition and the identity sensors are installed in at least one of a passenger compartment associated with the vehicle or a remote device disposed within the vehicle;
        program instructions to retrieve metadata associated with the identity wherein the metadata comprises one or more speed settings based on a travel route, the identity of the operator and the identity of the one or more passengers;
        program instructions to set a cruise control speed based on an analysis of the metadata wherein the analysis comprises selecting the cruise control speed based on the identity of the operator and the identity of the one or more passengers of the vehicle; and
        program instructions to update the metadata, associated with the operator, with speed setting changes made by the operator wherein the metadata is stored on at least one of a metadata database associated with the vehicle and a metadata database associated with a server communicatively connected to the vehicle.

* * * * *